(12) United States Patent
Boden et al.

(10) Patent No.: US 8,765,029 B2
(45) Date of Patent: Jul. 1, 2014

(54) LIGHT TRANSMISSIVE ARTICLES AND METHODS THEREOF

(75) Inventors: Eugene Pauling Boden, Scotia, NY (US); Brian Lee Lawrence, Clifton Park, NY (US); Steven James Montgomery, Evansville, IN (US); Shreyas Chakravarti, Evansville, IN (US); Peter Hendrikus Vollenberg, Evansville, IN (US); Edward Kung, Bergen op Zoom (NL); Jan Henk Kamps, Bergen op Zoom (NL); Lina Prada, Breda (NL); John Brian McDermott, Rexford, NY (US); Michael Teruki Takemori, Rexford, NY (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 824 days.

(21) Appl. No.: 11/633,925

(22) Filed: Dec. 5, 2006

(65) Prior Publication Data

US 2008/0130129 A1 Jun. 5, 2008

(51) Int. Cl.
*B29D 11/00* (2006.01)
*G02B 5/22* (2006.01)
*G02B 5/20* (2006.01)

(52) U.S. Cl.
CPC ............... *G02B 5/223* (2013.01); *G02B 5/208* (2013.01)
USPC .......................................................... 264/1.1

(58) Field of Classification Search
USPC .......................................................... 264/1.1
See application file for complete search history.

(56) References Cited

U.S. PATENT DOCUMENTS

| | | | |
|---|---|---|---|
| 4,931,523 A | 6/1990 | Watanabe et al. | |
| 5,852,112 A * | 12/1998 | Engardio et al. | 525/23 |
| 6,229,654 B1 | 5/2001 | Cabeza et al. | |
| 6,310,161 B1 | 10/2001 | Weissman | |
| 7,105,627 B1 | 9/2006 | Kannan et al. | |
| 2005/0215750 A1 | 9/2005 | Koga et al. | |
| 2006/0234061 A1 * | 10/2006 | Buckel et al. | 428/412 |
| 2006/0241273 A1 | 10/2006 | Bojkova et al. | |

FOREIGN PATENT DOCUMENTS

WO 0190244 A1 11/2001

OTHER PUBLICATIONS

Determination of Potential Migrants in Polycarbonate Containers Used for Microwave Ovens by High-Performance Liquid Chromatography with Ultraviolet and Fluorescence Detection; J. Agric. Food Chem. 2003, 51, 5647-5653 5647; Nerin etal.*
Encyclopedia of Optical Engineering v2; Driggers, Donald ed.; 2003; Marcel Dekker, New York; pp. 1374.*
International Search Report for PCT/US2007/073423 (Reference No. 205692) International Filing Date Jul. 13, 2007; Mailing Date Jun. 2, 2008 (6 pages).
Written Opinion of the International Searching Authority for PCT/US2007/073423 (Reference No. 205692) International Filing Date Jul. 13, 2007; Mailing Date Jun. 2, 2008 (6 pages).

* cited by examiner

*Primary Examiner* — Joseph S Del Sole
*Assistant Examiner* — John Robitaille
(74) *Attorney, Agent, or Firm* — Michael Best & Friedrich LLP

(57) ABSTRACT

The present invention provides methods for controlling the optical properties of a light transmissive article. The method includes identifying a target window in an Abbe diagram comprising reference polymeric materials. The method further includes selecting a first polymeric material from the reference polymeric materials and compounding the first polymeric material with a stable UV chromophore to provide a first polymer composition. The method further includes transforming the first polymer composition to provide the light transmissive article, wherein the light transmissive article has an Abbe number and a refractive index which falls within the target window. Light transmissive articles prepared using the above methods are also provided.

23 Claims, 2 Drawing Sheets

LIGHT TRANSMISSIVE ARTICLES AND METHODS THEREOF

BACKGROUND

The invention relates generally to light transmissive articles, and in particular to methods of controlling the optical properties of light transmissive articles.

Abbe number or the V-number of a light transmissive material is a measure of the dispersion of the material, where dispersion is defined as the variation of refractive index with wavelength. The Abbe number (V) of a material is defined as:

$$V = \frac{n_D - 1}{n_F - n_C}$$

where $n_D$, $n_F$ and $n_C$ are the refractive indices of the material at the wavelengths of the Fraunhofer D-, F- and C-spectral lines (589.2 nm, 486.1 nm and 656.3 nm, respectively). Generally, materials having high values of Abbe number exhibit low dispersion. In terms of the refractive index of the material, materials with high refractive index generally have a lower Abbe number than materials with low refractive index. Typical values of Abbe number range from around 20 for very dense flint glasses, to up to 65 for very light crown glass, and up to 85 for fluor-crown glasses.

Commercial optical applications are typically constrained to use materials that have a range of properties from low Abbe number and high refractive index material, to high Abbe number and low refractive index materials. Materials with low Abbe number and low refractive index are expensive and are difficult to obtain and therefore their usage is limited. It is desirable to provide a material with low Abbe number and low refractive index and methods of making the same.

BRIEF DESCRIPTION

In one embodiment, the present invention provides a method of controlling the optical properties of a light transmissive article, said method comprising:
(a) identifying a target window in an Abbe diagram comprising reference polymeric materials;
(b) selecting a first polymeric material from the reference polymeric materials;
(c) compounding the first polymeric material with at least one stable UV chromophore to provide a first polymer composition; and
(d) transforming the first polymer composition into the light transmissive article, wherein the light transmissive article has an Abbe number and a refractive index which falls within the target window.

In another embodiment, the present invention provides a method of controlling the optical properties of a light transmissive article, said method comprising:
(a) identifying a target window in an Abbe diagram comprising reference polymeric materials;
(b) selecting a first polymeric material from the reference polymeric materials;
(c) compounding the first polymeric material with at least one stable UV chromophore to provide a first polymer composition; and
(d) transforming the first polymer composition into a light transmissive article, wherein the target window has an Abbe number which is about 10 Abbe units lower than the Abbe number of the first polymeric material, and wherein the light transmissive article has an Abbe number and a refractive index which falls within the target window.

In yet another embodiment, the present invention provides a light transmissive article whose optical properties are controlled by a method, wherein said method comprises:
(a) identifying a target window in an Abbe diagram comprising reference polymeric materials;
(b) selecting a first polymeric material from the reference polymeric materials;
(c) compounding the first polymeric material with at least one stable UV chromophore to provide a first polymer composition; and
(d) transforming the first polymer composition into the light transmissive article, wherein the light transmissive article has an Abbe number and a refractive index which falls within the target window.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, the term "UV chromophore" refers to a compound that comprises at least one UV chromophoric group, and exhibits narrow band absorption in the UV (i.e., ultraviolet) regime of the electromagnetic spectrum. A chromophoric group exhibits narrow band absorption when its absorption spectrum is characterized by a center wavelength associated with the maximum absorption and a spectral width (full width at half of the maximum, FWHM) of less than about 500 nanometers in the UV regime, and in particular, at wavelengths between about 180 nanometers and about 380 nanometers.

As used herein, the term "low Abbe number" refers to a material having an Abbe number between about 10 and 35 Abbe units.

As used herein, the term "low refractive index" refers to a material having a refractive index value between about 1.40 and 1.60.

Materials having low Abbe number and low refractive index are limited in terms of their availability. Materials having a low Abbe number are of interest because such materials are highly dispersive and find application in multi-element systems for compensating dispersions, architectural applications requiring certain visual effects, diffraction gratings, and other diffractive structures.

The present invention provides access to a wide variety of low Abbe number materials by providing a means for controlling the Abbe numbers of polymeric materials and light transmissive articles prepared from them. According to various embodiments of the present invention, the optical properties of light transmissive articles may be controlled by identifying a target window in an Abbe diagram comprising reference polymeric materials, selecting a first polymeric material from the reference polymeric materials, compounding the first polymeric material with at least one stable UV chromophore to provide a first polymer composition, and transforming the first polymer composition into a light transmissive article, wherein the light transmissive article has an Abbe number and a refractive index which falls within the target window.

As used herein, the term "light transmissive" refers to a transmission of light of at least about 50 percent, particularly at least about 80 percent, and more particularly at least about 90 percent, of light in a selected wavelength range. The selected wavelength range of transmission may be in the visible region, infrared region or any combination thereof of the electromagnetic spectrum, and in particular embodiments, the wavelength is in a range from about 400 nanometers (nm) to about 900 nm.

Figure 1:
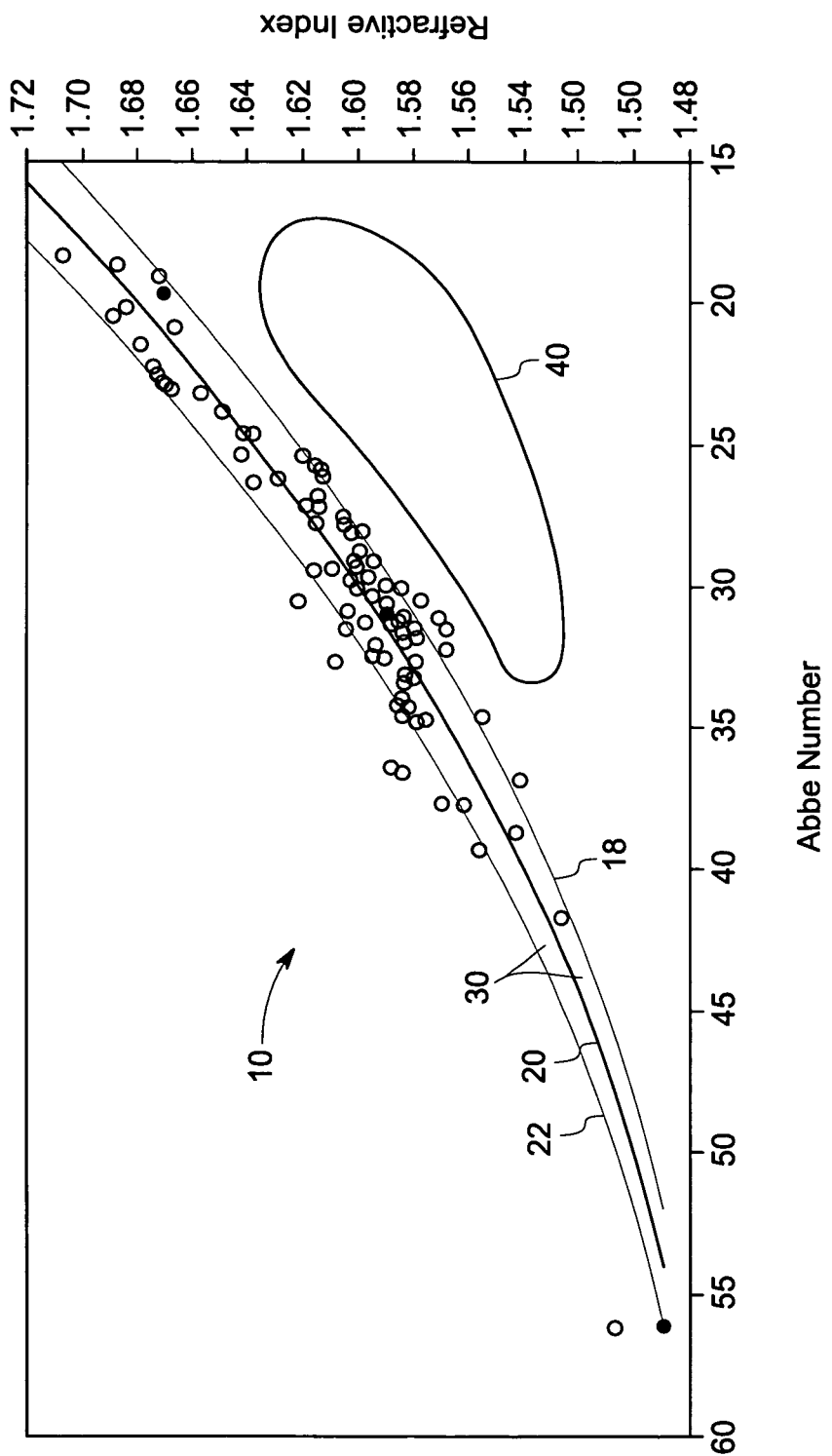
FIG. 1 is an Abbe diagram of reference polymeric materials.

Turning now to the figures, FIG. 1 is an Abbe diagram 10, showing an Abbe curve 20 (solid line) which is a plot of refractive index versus Abbe number of reference polymeric materials (as shown by the circles). The reference polymeric materials include commercially available polymers, such as polymethyl methacrylate and polycarbonate. The Abbe curve 20 in the figure is a quadratic fit to the Abbe numbers of all of the reference polymeric materials, and the curves 22 and 18 above and below the Abbe curve 20 correspond to +2 Abbe units and −2 Abbe units relative to the quadratic fit, respectively. The region under the curves above and below the Abbe curve 20 corresponding to +2 and −2 Abbe units to the quadratic fit is denoted as region 30 in FIG. 1. As can be seen, most of the reference polymeric materials fall within the region 30.

The method of the present invention comprises identifying a target window in the Abbe diagram 10 comprising reference polymeric materials. A target window 40 is identified in a region of the Abbe diagram 10 beyond region 30. As will be appreciated by those skilled in the art, the target window 40 may have an Abbe number and a refractive index that is desirable for the light transmissive article. In principle, the target window may be anywhere below or above the region 30 of the Abbe diagram 10. The target window 40 of FIG. 1 is a representative embodiment and the Abbe number and refractive index ranges of the target window 40 are not to be limited to the values shown in the figure. In one embodiment, the target window 40 has an Abbe number between about 10 Abbe units and 40 Abbe units. In another embodiment, the target window 40 has a Abbe number in a range from about 15 Abbe units to about 35 Abbe units. The refractive index of the target window 40, in one embodiment, is in a range from about 1.40 to about 1.80. In another embodiment, the target window 40 has a refractive index in a range from about 1.50 to about 1.60. In yet another embodiment, the target window has a refractive index in a range from about 1.60 to about 1.68.

A first polymeric material is selected from the reference polymeric materials. The refractive index and the Abbe number of the first polymeric material typically fall within the region 30 of the Abbe diagram 10. In one embodiment, the first polymeric material comprises an organic polymer or a mixture of organic polymers characterized by low refractive index at a selected wavelength range. In one embodiment, the selected wavelength range is between about 400 nm and about 900 nm. In some embodiments, the first polymeric material is substantially transparent. In the present context the term "substantially transparent" means allowing a transmission of light of at least about 80 percent, and more particularly at least about 90 percent, of light in a selected wavelength range.

In one embodiment, the first polymeric material may comprise a thermoplastic polymeric material, a thermosetting polymeric material, or a combination thereof. Non-limiting examples of thermoplastic polymeric materials include polyacrylates, polymethacrylates, polyamides, polyesters, polyolefins, polycarbonates, polystyrenes, polyamideimides, polysulfones, polyethersulfones, polyphenylene sulfides, polysulfones, polyimides, polyetherimides, polyetherketones, polyether etherketones, polyether ketone ketones, polysiloxanes, polyurethanes, polyaromaticene ethers, polyethers, polyether amides, polyether esters, like polymeric materials, and a combination comprising at least one of the foregoing thermoplastic polymeric materials. Other examples of thermoplastic polymeric materials include, but are not limited to, amorphous thermoplastic polymer materials and polymer blends, such as, polyvinyl, chloride, linear and cyclic polyolefins, chlorinated polyethylene, polypropylene, and the like; hydrogenated polysulfones, acrylonitrile butadiene styrene (ABS) resins, hydrogenated polystyrenes, syndiotactic and atactic polystyrenes, polycyclohexyl ethylene, styrene-acrylonitrile copolymer, styrene-maleic anhydride copolymer, and the like; polybutadiene, polymethylmethacrylate (PMMA), methyl methacrylate-polyimide copolymers; polyacrylonitrile, polyacetals, polyphenylene ethers, including, but not limited to, those derived from 2,6-dimethylphenol and copolymers with 2,3,6-trimethylphenol, and the like; ethylene-vinyl acetate copolymers, polyvinyl acetate, ethylene-tetrafluoroethylene copolymer, aromatic polyesters, polyvinyl fluoride, polyvinylidene fluoride, and polyvinylidene chloride. In some embodiments, the first polymeric material is a polycarbonate. The polycarbonate may be an aromatic polycarbonate, an aliphatic polycarbonate, or a polycarbonate comprising both aromatic and aliphatic structural units. One example of a suitable polycarbonate is LEXAN®, commercially available from General Electric Company.

Thermosetting polymeric materials are illustrated by epoxy polymers, thermosetting phenolic polymers, thermosetting polysiloxanes, thermosetting polyesters, thermosetting polyurethanes, thermosetting polyamides, thermosetting polyacrylates, thermosetting polymethacrylates, and combinations comprising at least one of the foregoing thermosetting polymeric materials.

The first polymeric material is compounded with at least one stable UV chromophore to provide a first polymer composition. It has been discovered that by judicious selection of the both amount of and the structure of the UV chromophore the refractive index and the Abbe number of the first polymer composition may be controlled. For example, compounding a first polymeric material with an appropriate UV chromophore at an appropriate loading level can be used to shift the refractive index and the Abbe number of the first polymeric material from the region 30 towards the target window 40 in the first polymer composition.

As used herein, the term "stable UV chromophore" implies that the UV chromophore is optically stable under the conditions of use. Conditions of use typically include exposure to light having a wavelength in a range from about 320 nm to about 900 nm. The stable UV chromophore typically exhibits an absorption spectrum. in a range between about 180 nm and 380 nm.

Figure 2:
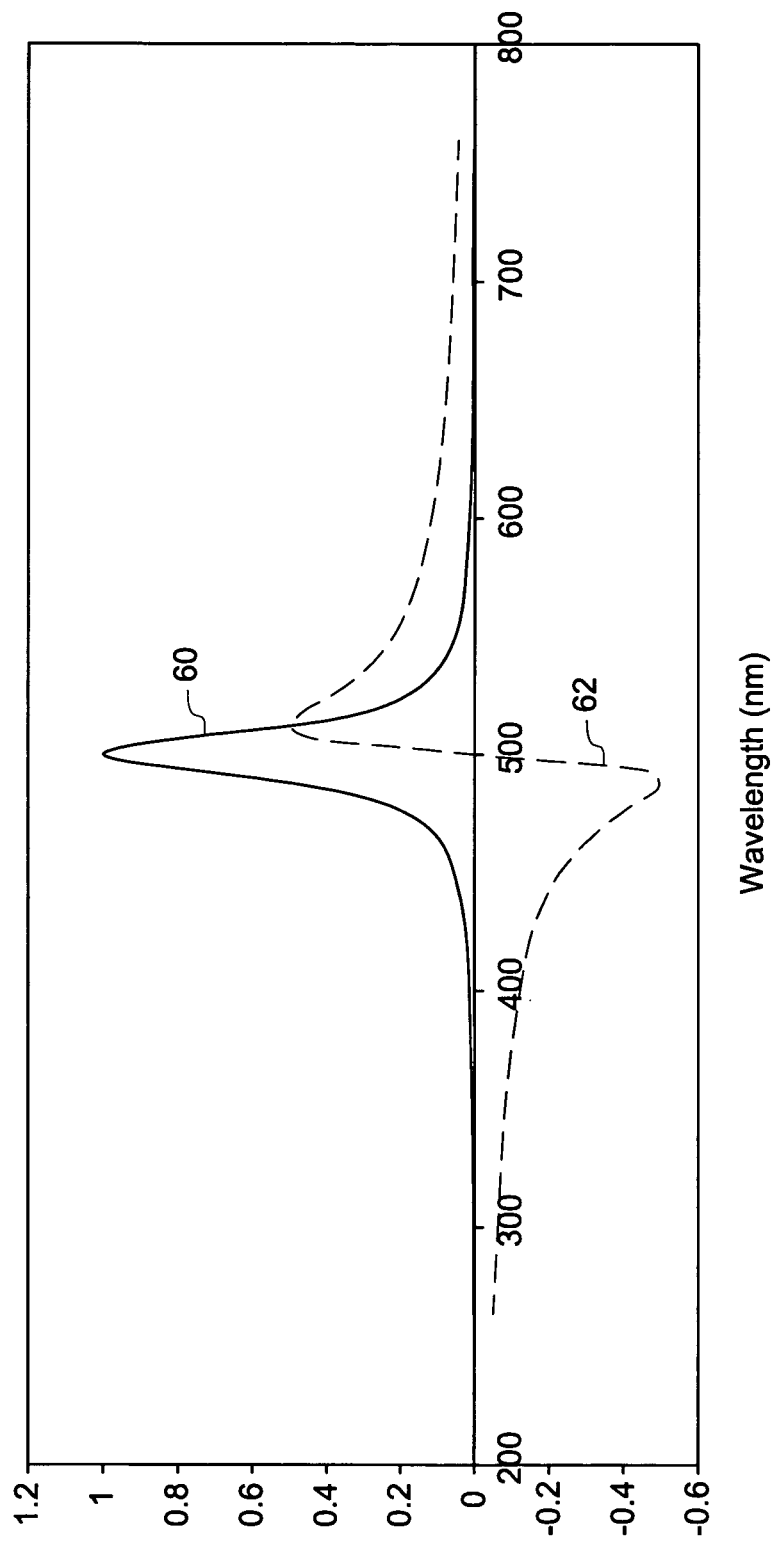
FIG. 2 are plots of absorbance with wavelength, and refractive index with wavelength according to Kramers-Kronig relationship.

FIG. 2 illustrates the known Kramers-Kronig relationship which shows how the refractive index of a material varies near an absorption maximum of said material. In FIG. 2 curve 60 illustrates a typical absorption curve for a light absorbing material. The absorption curve 60 is normalized to a value of 1 at the maximum absorption. Dashed curve 62 illustrates the change in the refractive index of a material exhibiting absorption curve 60 as a function of wavelength. In the example of FIG. 1, the maximum change in refractive index is normalized to a value of 0.5, while the minimum change is set to −0.5. Thus, incorporation of a chromophore in a polymeric material may modify the refractive index of the first polymeric material in accordance with the principles illustrated in FIG. 2.

Thus, the first polymeric material is compounded with a stable UV chromophore to provide a first polymer composition exhibiting a combined absorption spectrum comprising the absorption spectra of the stable UV chromophore and the first polymeric material. As depicted in FIG. 2, the first polymer composition exhibits an absorption spectrum, shown by curve 60. Dashed line 62 represents the change in the refractive index of the first polymer composition as a function of the wavelength at which the refractive index is measured. As can be seen in FIG. 2 the change in the refractive index of the first polymer composition exhibits maximum sensitivity to wavelength in the region of the absorption peak, i.e. at wavelengths near the wavelength corresponding to the absorption maximum. In addition, the refractive index of the first polymer composition is lowered at wavelengths less than the wavelength of the absorption maximum and is raised at wavelengths greater than the wavelength of the absorption maximum (dashed line 62 line in FIG. 2), the refractive index at the wavelength corresponding to the absorption maximum representing an inflection point. In the present invention, by the judicious choice of a suitable UV chromophore, the refractive index and the Abbe number of the first polymeric material may be modified to provide the first polymer composition having a desired set of optical properties.

In one embodiment, the first polymer composition comprises at least one stable UV chromophore comprising at least one chromophoric group having an absorption maximum in a wavelength range between about 180 nm and about 380 nm. Non-limiting examples of the chromophoric groups include, but are not limited to, carbon-carbon double bonds (—C═C—), carbon-carbon triple bonds (—C≡C—), carbon-oxygen double bonds (—C═O—), carbon-nitrogen double bonds (—C═N—), nitrogen-oxygen double bonds (—N═O—) nitrogen-nitrogen double bonds (—N═N—), and combinations of such bonding arrangements, for example a combination of a carbon-carbon double bond (—C═C—) with an oxygen double bond (—C═O—) as in an enone.

In one particular embodiment, the at least one stable UV chromophore is selected from the group consisting of compound I and compound II. Compound I, 2-(4,6-diphenyl-1,3, 5-triazine-2-yl)-5-hexyloxyphenol, is a UV absorber (UVA) commercially available as TINUVIN® 1577 (available from CIBA Specialty Chemicals).

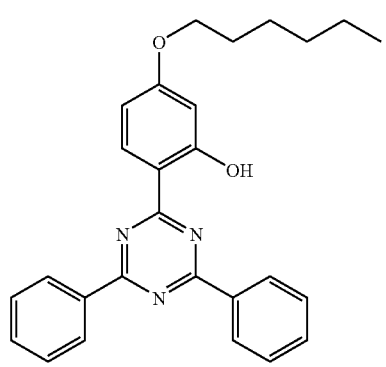

Compound I

Compound II, 2-2′-(1,4-phenylene)bis(4H-3,1-benzoxazin-4-one), is a commercially available UV absorber known as CYASORB® UV-3638 (available from Cytec Industries Inc.).

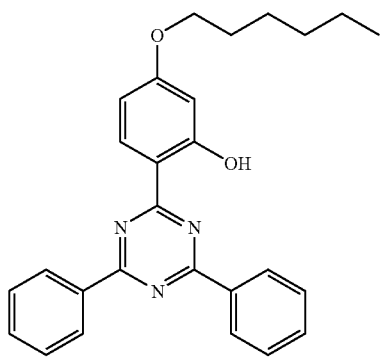

Compound II

Suitable stable UV chromophores for use according to the method of the present invention include, but are not limited to, stilbenes, benzophenones, benzotriazoles, triazines, cyanoacrylates, oxanilides, formamidines, benzilidine malonates, and combinations of two or more of the foregoing stable UV chromophores.

Subsequent to the selection of the at least one stable UV chromophore, the stable UV chromophore is compounded with the first polymeric material to form the first polymer composition. In one embodiment, compounding the first polymeric material with the stable UV chromophore is performed in a conventional reaction vessel such as, a single or twin screw extruder, kneader, blender, or the like capable of adequately melt mixing the first polymeric material, the stable UV chromophore, and any additional components desired to be present in the first polymer composition. Additional components which may be desired to be present in the first polymer composition include, additives such as mold release agents, lubricants, colorants, fillers, heat stabilizers, light sensitizers, phosphors, flame retardants, and the like. The first polymeric material, the stable UV chromophore, and any additional components desired to be present in the first polymer composition are referred to collectively as the "first polymer composition precursors", or simply the "precursors".

In a number of embodiments, single screw extruders and twin screw extruders are suitable for melt mixing the first polymer composition precursors. Typically, the extruder should be maintained at a sufficiently high temperature to melt the precursors without causing decomposition thereof. When the first polymeric material is polycarbonate, for example, temperatures from about 220° C. to about 360° C. are typically used, with about 260° C. to about 320° C. being preferred temperatures. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet or the like), the mixture can optionally be filtered, such as by melt filtering and/or the use of a screen pack, or the like, to remove undesirable contaminants or decomposition products to form the first polymer composition.

In another embodiment, the first polymer composition is prepared as a solution comprising the first polymeric material, the stable UV chromophore, any additional components desired to be present, and a solvent. The term "compounding"

thus refers to any suitable means of combining the components of the first polymer composition. In one embodiment, the first polymer composition comprising the first polymeric material, the stable UV chromophore, any additional components desired to be present, and a solvent is transformed into a light transmissive article by a solvent casting process. Thus, a solution comprising the first polymeric material and the stable UV chromophore is applied to a substrate and the solvent is thereafter removed to afford a film. Other methods of compounding the at least one stable UV chromophore with the first polymeric material involving solvents include, but are not limited to, precipitation or dip coating techniques.

The first polymer composition is transformed using any suitable technique into a light transmissive article. Most typically, this transforming step takes the form of molding the first polymer composition into the light transmissive article using conventional molding techniques such as compression molding, blow molding, injection molding, thermoforming, resin transfer molding, and heat transfer molding. In certain embodiments, the light transmissive article is a film which may be formed from a molten first polymer composition using, for example, extruded film-forming techniques or blown film-forming techniques. In certain embodiments, a combination of transforming steps is used to prepare the light transmissive article from the first polymer composition. For example, in one embodiment, the first polymer composition is first extruded into a first light transmissive article which is a film, and subsequently the extruded film is transformed by thermoforming into a second light transmissive article which is a thermoformed article. It will be appreciated by those skilled in the art that when the first polymer composition comprising the first polymeric material and the at least one stable UV chromophore is transformed into a light transmissive article under melt processing conditions such as injection molding, the components of the first polymer composition should be capable of withstanding the melt processing conditions required to transform the first polymer composition into the light transmissive article. The light transmissive article may have almost any desired shape and size.

In one embodiment, the stable UV chromophore is present in the light transmissive article in an amount from about 2 weight percent to about 40 weight percent. In some embodiments, the stable UV chromophore is present in the light transmissive article in an amount from about 5 weight percent to about 15 weight percent. In one particular embodiment, the stable UV chromophore is present in the light transmissive article in an amount from about 20 weight percent to about 30 weight percent. As used herein, the term "weight percent" refers to a ratio of the weight of the stable UV chromophore included in the first polymer composition to the total weight of the first polymer composition (inclusive of the weight of the UV chromophore).

The loading percentage of the UV chromophore may be controlled such that the light transmissive article falls within the target window 40 of the Abbe diagram 10, in FIG. 1. The light transmissive article thus formed using embodiments of the present invention falls within the target window 40 of the Abbe diagram 10. In one embodiment, the light transmissive article has an Abbe number which is about 10 Abbe units lower than that of the first polymeric material. In some embodiments, the light transmissive article has an Abbe number between about 10 Abbe units and 40 Abbe units. In another embodiment, the light transmissive article has an Abbe number in a range from about 15 Abbe units to about 35 Abbe units. The refractive index of the light transmissive article, in one embodiment, is in a range from about 1.40 to about 1.80. In another embodiment, the light transmissive article has a refractive index in a range from about 1.54 to about 1.66. In yet another embodiment, the light transmissive article has a refractive index in a range from about 1.60 to about 1.68.

The light transmissive article of the present invention finds use in various optical applications. In one embodiment, the light transmissive article is a lens element in a chromatic-aberration-corrected multiple lens system. In some embodiments, the light transmissive article is a prism, a lens, a lens element or a combination of two or more of the foregoing.

Typically, a single lens made of glass such as fused silica or BK7, may suffer from chromatic aberration, wherein a light beam composed of different wavelengths passing through the lens will focus at different locations. Chromatic aberration may be minimized using an achromatic lens system which is a combination of lenses made of different materials. For example, in an achromatic lens system involving two lenses, a first lens can be employed which is a relatively strong, positive lens made of low-dispersion (i.e., high Abbe number) glass such as crown glass. As used herein, the term "strong" lens refers to short focal length lens relative to desired focal length of the pair of lenses. As used herein, the term "positive" lens refers to converging lens where the focal length of the lens is expressed as a positive number. The second lens can be of a relatively weak, negative lens made of high-dispersion (i.e., low Abbe number) glass such as flint glass. As used herein, the term "weak" lens refers to longer focal length lens relative to the first lens. As used herein, the term "negative" lens refers to diverging lens where the focal length of the lens is expressed as a negative number. The selection of the focal lengths of the lenses are determined by the desired focal length of the pair and dispersive powers of the material used to make the lenses, and can be calculated using the equations 1 and 2;

$$f_1 = F\left(\frac{V_1 - V_2}{V_1}\right) \qquad (1)$$

$$f_2 = F\left(\frac{V_2 - V_1}{V_2}\right) \qquad (2)$$

Here, $f_1$ and $f_2$ are the focal lengths of the first lens and the second lens respectively, F is the desired focal length of the pair and $V_1$ and $V_2$ are the Abbe numbers of the materials of the first lens and the second lens, respectively.

For microscope and telescope objective lenses, it is desirable to have weak lenses made of a material having low refractive index and low Abbe number. Currently available optical glass materials may not meet the above needs. Optical polymeric materials typically have low refractive index and high Abbe number and hence may not be suitable for fabricating microscopic and telescopic lenses. In one embodiment of the invention, the light transmissive article may be an achromatic lens pair where the positive lens element is composed of a first polymeric material and the negative lens element is composed of the first polymeric material with at least one stable UV chromophore, said negative lens having the desired, low Abbe number. Using embodiments of the present invention the desired focal length of the objective may be obtained by varying the amount of the at least one UV chromophore present in the first polymer composition used to prepare the negative lens.

In one embodiment, the present invention provides a light transmissive article the optical properties of which are controlled using the method of the present invention. In one embodiment, the present invention provides an optical article which is a telescope objective comprising a lens pair. In this example, the desired focal length, F, of the lens pair is 25 cm and polycarbonate is used as the base material with an approximate refractive index, n, or 1.585 and an Abbe number, $V_1$, of approximately 32. The second lens may be fabricated from an 80/20 blend of PCX/PCCD (PCX=50/50 copolymer of BPA and DMBPC), with 15 wt % CYASORB, resulting in a refractive index of 1.592 and an Abbe number, $V_2$, of 22. Using equations 1 and 2, the focal length of the first positive lens is $f_1=0.3125\times F=7.8125$ cm and the focal length of second negative lens is $f_2=-0.4545\times F=-11.3625$ cm. Similar calculations can be done using even lower refractive index materials such as PMMA or PCCD. Using the calculated focal lengths and refractive indices of the two materials, we can also use equation 1 to calculate the radii of curvature of the two lenses. For the first positive biconvex lens with a focal length of 7.8125 cm and fixing one of the two surfaces at 10 cm radius of curvature, the second surface radius is −8.42 cm. For the second negative biconcave lens with a focal length of −11.3625 and fixing one of the two surfaces at −10 cm radius of curvature, the second surface radius is 20.55 cm.

In another embodiment, the light transmissive article may be an element of an aplanatic achromatic lens pair to minimize spherical aberration in the lens pair. As used herein, the term "spherical aberration" refers to image imperfections due to spherical shape of the optical element. The aplanatic achromatic lens pair is useful for imaging systems where wide fields of view is required. Typically, the design process for an aplanatic achromatic doublet begins by selecting a high-dispersion flint glass. A desired refractive index is selected for the low-dispersion crown glass. The Abbe number required to minimize chromatic aberration can be calculated using equations 1 and 2. The chosen refractive index and the calculated Abbe number can be compared against known materials. The process is repeated until a match is found. The processing steps thus involved in designing the aplanatic achromatic lens pair may be minimized using embodiments of the present invention by selecting a first polymeric material having a suitable refractive index and achieving the calculated Abbe number by adding suitable amount of the at least one stable UV chromophore in the first polymeric material. Embodiments of the present invention may advantageously provide a significant improvement in design capability as performance need not be traded off for the lack of available materials.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

Example 1

Preparation of copolymers of dimethyl trans-4,4'-stilbenedicarboxylate; dimethyl trans-1,4-cyclohexanedicarboxylate; and 1,4-cyclohexane dimethanol: This example illustrates the synthesis of a copolymer comprising 16 weight % trans-4,4'-stilbenedicarboxylate units, the remainder of the composition comprising structural units derived from dimethyl trans-1,4-cyclohexanedicarboxylate and 1,4-cyclohexane dimethanol. The optical properties of the product polymer were compared with a reference polymer PCCD which comprises only structural units derived from dimethyl trans-1,4-cyclohexanedicarboxylate and 1,4-cyclohexane dimethanol.

A mixture of 17.2 lbs. (39.0 mol) of dimethyl trans-1,4-cyclohexanedicarboxylate, 6.4 lbs. (9.7 mol) of dimethyl trans-4,4'-stilbenedicarboxylate, and 15.4 lbs. (48.5 mol) 1,4-cyclohexanedimethanol and 14 g of titanium tetraisopropoxide was placed in a 15 gallon reactor equipped with a nitrogen inlet, dual helical stirrers, and a short distillation column. The reactor was heated gradually to 250° C. over a period of about 1 hour. Once the overhead distillation of methanol had abated, a vacuum of about 1.5 torr was applied gradually to the reactor. Full vacuum was maintained for approximately 30 minutes. A high melt viscosity, clear polymer with an intrinsic viscosity (I.V.) of 0.98 was obtained. A second copolymer comprising about 24 weight percent trans-4,4'-stilbenedicarboxylate units was prepared in a similar procedure (See Table 1).

TABLE 1

| UVA | Weight percent of UVA |
|---|---|
| Sample 1 | 16 |
| Sample 2 | 24 |

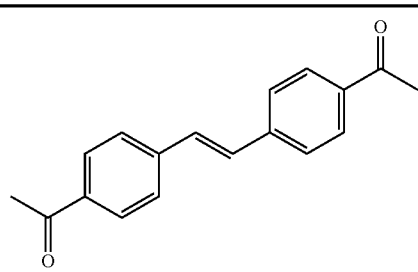

The resultant polymer compositions (samples 1 and 2) were injection molded into circular disks having a diameter of 80 millimeters (mm) and a thickness of 3 mm. The refractive index and the Abbe number of the disks were measured using a J. A. Woollam spectroscopic ellipsometer (M-2000®) and are given in Table 4.

Example 2

Blend Compositions of 1,1-bis(4-hydroxy-3-methylphenyl)cyclohexane-(DMBPC), 2,2-bis(4-hydroxyphenyl) propane-(BPA) copolycarbonate with PCCD and UV Absorbers: A set of samples were prepared and the compositions of these are given in Table 2.

TABLE 2

| | UVA | DMBPC/BPA copolymer in weight percent | PCCD in weight percent | Weight percent of UVA |
|---|---|---|---|---|
| Sample 3 | CYASORB ® UV-3638 | 59 | 41 | 6 |
| Sample 4 | CYASORB ® UV-3638 | 69 | 31 | 7.5 |
| Sample 5 | CYASORB ® UV-3638 | 59 | 41 | 8 |
| Sample 6 | CYASORB ® UV-3638 | 73 | 27 | 8 |
| Sample 7 | CYASORB ® UV-3638 | 80 | 20 | 15 |
| Sample 8 | TINUVIN ® 1577 | 36 | 64 | 5 |
| Sample 9 | TINUVIN ® 1577 | 35 | 65 | 15 |
| Sample 10 | TINUVIN ® 1577 | 80 | 20 | 15 |

The resultant polymer compositions (samples 3 to 10) were injection molded into 51 millimeter (mm)×76 mm rectangular samples having a thickness of 2.4 mm The refractive index and the Abbe number of the disks were measured using a J. A. Woollam spectroscopic ellipsometer (M-2000®) and are given in Table 4.

Example 3

Preparation of copolymers of tertiary-butyl hydroquinone (t-BHQ) and 2,2-bis(4-hydroxyphenyl) propane (BPA) via reactive extrusion and compounding with UV absorbers:

Melt Oligomerization-Reactive Extrusion: A 50 mole percent t-BHQ/BPA copolycarbonate was prepared via melt oligomerization of t-BHQ and BPA with bis(methyl salicyl) carbonate (BMSC) followed by a reactive extrusion process to achieve high molecular weight BHQ/BPA copolycarbonate. A stainless steel tank reactor equipped with stirrers was charged with about 10953 g of BPA, 7975.5 g of t-BHQ, 32187.6 g of BMSC and 252.8 g of p-cumylphenol (PCP) in a molar ratio of BMSC/BPA to t-BHQ of about 1:1.0155. An aqueous catalyst solution of tetramethylammonium hydroxide (1650 microliter (μl), TMAH) and sodium hydroxide (NaOH) were added to the reactor. The reactor was then evacuated and purged with nitrogen three times to remove residual oxygen and then held at a constant vacuum pressure of 800 mbar. The reactor was then heated to 170° C. in order to melt and oligomerize the reactants. After approximately 4 hours and 30 minutes from the start of heating, the reactor was pressurized with nitrogen to a constant overpressure of 1.4 bar, and the molten reaction mixture was fed through a 170° C. heated feed-line into an extruder at a rate of 13.5 kg/h. The extruder employed was a Werner & Pfleiderer ZSK25WLE 25 mm, 13-barrel, twin-screw extruder with a length/diameter ratio (L/D) of 59. The feed inlet communicating with the extruder comprised a flash-valve to prevent boiling of the molten mixture. The extruder was equipped with five forward vacuum vents and one back-vent. The vacuum pressure of the back-vent was about 13 mbar. The vacuum pressure of the first forward vent was about 14 mbar and the vacuum pressure of the final four forward vents was less than about 1 mbar. The methyl salicylate by-product was removed via devolatilization through the vacuum vents. All the extruder barrels were set at a temperature of 300° C. and the extruder die head was set at a temperature of 310° C. The reaction mixture was reactively extruded at a screw speed of 300 rpm.

A set of samples were prepared with different amounts of UV absorbers in the 50 mole percent t-BHQ/BPA copolycarbonate. The 50 mol % t-BHQ/BPA copolycarbonate was compounded with UV absorbers on a twin-screw extruder (Werner & Pfleiderer ZSK25WLE). The barrel temperature was set at 300° C. and the screw speed was set at 300 rpm. During extrusion a vacuum in the range between about 150 and 350 mbar was applied. Two feeders were used to feed the polymer and the UV absorbers to the extruder at a total feeding rate of 15 kg/h. The polymer strand emerging from the extruder was cooled in a water bath and pelletized. The following samples with different compositions where produced during extrusion and are given in Table 3. The refractive index and the Abbe number of the disks were measured using a J. A. Woollam spectroscopic ellipsometer (M-2000®) and are given in Table 4.

TABLE 3

| | UVA | Weight percent of UVA |
|---|---|---|
| Sample 11 | CYASORB ® UV-3638 | 10 |
| Sample 12 | TINUVIN ® 1577 | 10 |
| Sample 13 | TINUVIN ® 1577 | 20 |

Example 4

Preparation of 2,2-bis(4-hydroxyphenyl) propane polycarbonate (BPA-PC) with UV absorber: BPA-PC was compounded with 5 weight percent of CYASORB® UV-3638 in a twin-screw extruder. The polymer strand coming out of the extruder was cooled in a water bath and pelletized.

The resultant polymer composition (sample 14) was injection molded into a circular disk having a diameter of 102 millimeters (mm) and a thickness of 3.2 mm. The refractive index and the Abbe number of the disk was measured using a J. A. Woollam spectroscopic ellipsometer (M-2000®) and is given in Table 4.

TABLE 4

| Sample No. | Refractive index of first polymeric material | Refractive index of the light transmissive article | Abbe Number of the first polymeric material | Abbe Number of the light transmissive article |
|---|---|---|---|---|
| 1 | 1.51 | 1.55 | 56 | 32 |
| 2 | 1.51 | 1.57 | 56 | 23 |
| 3 | 1.55 | 1.57 | 38 | 30 |
| 4 | 1.56 | 1.57 | 36 | 29 |
| 5 | 1.55 | 1.56 | 38 | 31 |
| 6 | 1.56 | 1.58 | 36 | 28 |
| 7 | 1.57 | 1.59 | 34 | 22 |
| 8 | 1.53 | 1.59 | 42 | 27 |
| 9 | 1.53 | 1.56 | 42 | 28 |
| 10 | 1.57 | 1.59 | 34 | 27 |
| 11 | 1.57 | 1.59 | 33 | 24 |
| 12 | 1.57 | 1.58 | 33 | 28 |
| 13 | 1.57 | 1.58 | 33 | 28 |
| 14 | 1.59 | 1.59 | 32 | 27 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling the optical properties of a polymeric material, said method comprising:
    (a) identifying a target window in an Abbe diagram;
    (b) selecting polymeric material having a refractive index and an Abbe number that is outside of the target window;
    (c) selecting at least one stable UV chromophore;
    (d) compounding the polymeric material with the at least one stable UV chromophore of step (c), wherein the at least one stable UV chromophore shifts the Abbe number and refractive index of the polymeric material into the target window; and
    (e) transforming the polymeric material of step (d) into a light transmissive article,
    wherein the light transmissive article has an Abbe number in a range from about 10 Abbe units to about 32 Abbe units, and
    wherein the at least one stable UV chromophore is selected from the group consisting of compounds I and II

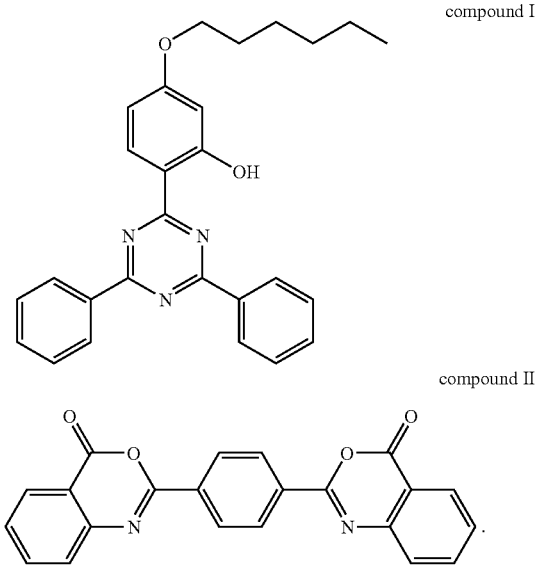

2. The method according to claim 1, wherein the polymeric material comprises one or more of the following: a polycarbonate, a polymethyl methacrylate, a polypropylene a polyetherimide, a polyimide, a polyethylene, a polystyrene, a polysulfone, a polyether sulfone, and a polyester.

3. The method according to claim 1, wherein the at least one stable UV chromophore exhibits maximum absorption in a wavelength range from about 180 nanometers to about 380 nanometers.

4. The method according to claim 1, wherein the at least one stable UV chromophore of step (c) comprises one or more of the following: stilbene, benzophenone, benzotriazole, triazine, cyanoacrylate, oxanilide, formamidine, and benzilidine malonate.

5. The method according to claim 1, wherein the at least one stable UV chromophore is present in the light transmissive article in an amount from about 2 weight percent to about 40 weight percent.

6. The method according to claim 1, wherein the at least one stable UV chromophore is present in the light transmissive article in an amount from about 5 weight percent to about 15 weight percent.

7. The method according to claim 1, wherein the light transmissive article has a refractive index in a range from about 1.40 to about 1.80.

8. The method according to claim 1, wherein the light transmissive article is a prism, a lens, a lens element in a chromatic-aberration-corrected multiple lens system, or a combination of two or more of the foregoing.

9. A method of controlling the optical properties of a light transmissive article, said method comprising:
    (a) identifying a target window in an Abbe diagram;
    (b) selecting a polymeric material having a refractive index and an Abbe number that is outside of the target window;
    (c) selecting at least one stable UV chromophore;
    (d) compounding the polymeric material with the at least one stable UV chromophore of step (c), wherein the at least one stable UV chromophore shifts the Abbe number and refractive index of the polymeric material into the target window; and
    (e) transforming the polymeric material of step 9d) into a light transmissive article;
    wherein the target window has an Abbe number in a range from about 10 Abbe units to about 32 Abbe units, wherein the light transmissive article has an Abbe number and a refractive index which falls within the target window, and wherein the at least one stable UV chromophore is selected from the group consisting of compounds I and II

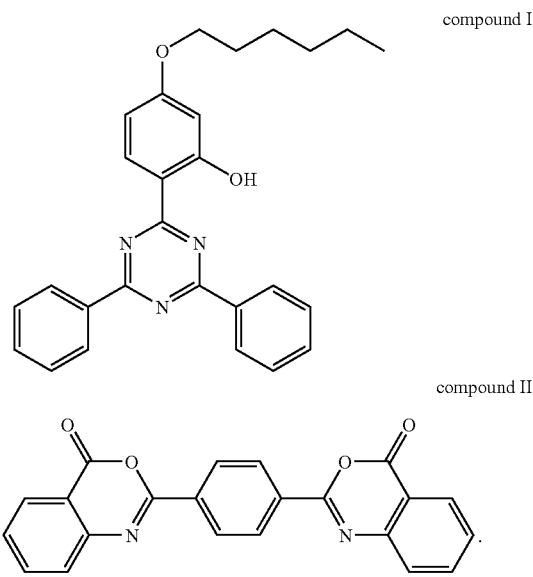

10. The method according to claim 9, wherein the at least one stable UV chromophore has a peak absorption in a wavelength range from about 180 nanometers to about 380 nanometers.

11. The method according to claim 1, wherein the at least one stable UV chromophore comprises one or more of the following: stilbene, benzophenone, benzotriazole, triazine, cyanoacrylate, oxanilide, formamidine, and benzilidine malonate.

12. The method according to claim 9, wherein the at least one stable UV chromophore is present in an amount from about 2 weight percent to about 40 weight percent.

13. A light transmissive article whose optical properties are controlled by the method of claim 1.

14. A light transmissive article whose optical properties are controlled by a method, wherein said method comprises
   (a) identifying a target window in an Abbe diagram;
   (b) selecting a polymeric material having a refractive index and an Abbe number that is outside of the target window;
   (c) selecting at least one stable UV chromophore;
   (d) compounding the polymeric material with the at least one stable UV chromophore of step (c), wherein the at least one stable UV chromophore shifts the Abbe number and refractive index of the polymeric material into the target window; and
   (e) transforming the polymeric material of step (d) into a light transmissive article, and wherein the at least one stable UV chromophore is selected from the group consisting of compounds I and II

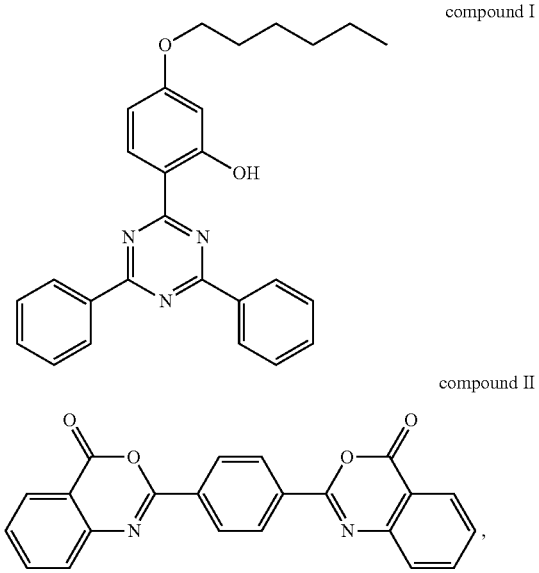

compound I compound II wherein the light transmissive article has an Abbe number in a range from about 10 Abbe units to about 32 Abbe units.

15. The light transmissive article according to claim 14, wherein the polymeric material comprises one or more of the following: polycarbonate, a polymethyl methacrylate, a polypropylene, a polyetherimide, a polyimide, a polyethylene, a polystyrene, a polysulfone, a polyether sulfone, and a polyester.

16. The light transmissive article according to claim 14, wherein the at least one stable UV chromophore has a peak absorption in a wavelength range from about 180 nanometers to about 380 nanometers.

17. The light transmissive article according to claim 14, wherein the at least one stable UV chromophore is present in the light transmissive article in an amount from about 2 weight percent to about 40 weight percent.

18. The light transmissive article according to claim 14, wherein the at least one stable UV chromophore comprises one or more of the following: stilbene, benzophenone, benzotriazole, triazine, cyanoacrylate, oxanilide, formamidine, and benzilidine malonate.

19. The light transmissive article according to claim 14, wherein the light transmissive article has a refractive index which is in a range from about 1.40 to about 1.80.

20. The method of claim 1, wherein the light transmissive article has an Abbe number in a range from about 22 Abbe units to about 32 Abbe units.

21. The method of claim 9, wherein the target window has an Abbe number in a range from about 22 Abbe units to about 32 Abbe units.

22. The method of claim 14, wherein the light transmissive article has an Abbe number in a range from about 22 Abbe units to about 32 Abbe units.

23. The method of claim 1, wherein the polymeric material is a polycarbonate.

* * * * *